(12) United States Patent
Karl et al.

(10) Patent No.: US 6,503,311 B1
(45) Date of Patent: Jan. 7, 2003

(54) AQUEOUS CARBON BLACK DISPERSIONS

(75) Inventors: Alfons Karl, Gründau (DE); Werner Kalbitz, Rodenbach (DE); Horst Kleinhenz, Grosskrotzenburg (DE); Gerd Tauber, Seligenstadt (DE)

(73) Assignee: Degussa AG, Dusseldorf (DE)

( * ) Notice: Subject to any disclaimer, the term of this patent is extended or adjusted under 35 U.S.C. 154(b) by 0 days.

(21) Appl. No.: 09/705,796

(22) Filed: Nov. 6, 2000

(30) Foreign Application Priority Data

Nov. 11, 1999 (DE) .......................................... 199 54 260

(51) Int. Cl.$^7$ .............................................. C09D 11/00
(52) U.S. Cl. ...................................... 106/31.9; 106/478
(58) Field of Search ................................ 106/31.9, 478; 423/449.5

(56) References Cited

U.S. PATENT DOCUMENTS

| | | | | |
|---|---|---|---|---|
| 3,620,792 A | * | 11/1971 | Hagopian .................... | 106/478 |
| 5,609,671 A | * | 3/1997 | Nagasawa ................. | 106/31.65 |
| 5,846,307 A | * | 12/1998 | Nagasawa et al. ........ | 106/31.65 |
| 5,861,447 A | * | 1/1999 | Nagasawa et al. .......... | 106/472 |
| 6,099,632 A | * | 8/2000 | Nagasawa et al. ........ | 106/31.65 |
| 6,120,594 A | * | 9/2000 | Curtis et al. ................. | 106/472 |
| 6,123,759 A | * | 9/2000 | Mise et al. ................. | 106/31.9 |

FOREIGN PATENT DOCUMENTS

| | | |
|---|---|---|
| EP | 0 802 247 | 10/1997 |
| EP | 0 819 737 | 1/1998 |
| EP | 0 896 986 | 2/1999 |
| EP | 0 969 052 | 1/2000 |
| EP | 1 035 178 | 9/2000 |

OTHER PUBLICATIONS

English language abstract of OR above.

* cited by examiner

Primary Examiner—Helene Klemanski
Assistant Examiner—Veronica F. Faison
(74) Attorney, Agent, or Firm—Pillsbury Winthrop LLP

(57) ABSTRACT

Aqueous carbon black dispersions, wherein the carbon black dispersions contain no wetting agent and contain at least one ozone-oxidized carbon black. The dispersions are produced by dispersing ozone-oxidized carbon black and other constituents in water. The dispersions may be used for the production of inks, printing inks and water-based lacquer systems.

9 Claims, No Drawings

AQUEOUS CARBON BLACK DISPERSIONS

CROSS-REFERENCE TO RELATED APPLICATION

This application is based on German Application DE 199 54 260.0, filed Nov. 11, 1999, which disclosure is incorporated herein by reference.

FIELD OF THE INVENTION

This invention relates to aqueous carbon black dispersions, to a process for the production thereof and to the use thereof.

BACKGROUND OF THE INVENTION

Aqueous carbon black dispersions are used for the production of printing inks or also directly as inks, for example in inkjet printers.

The inkjet printing process is a known reproduction method in which the printing ink is transferred without pressure, i.e. without the print head coming into contact with the print medium. In this process, ink drops are sprayed from a nozzle onto a receiving material, the nozzle being electronically controllable. This method, also known as pressureless printing, is in particular suitable for printing products with irregular surfaces and packages because there is a certain distance between the print head and the material being printed. This printing process is very flexible and relatively low in cost and is thus also used for computer printing, for example as a personal printer. The inkjet process is increasingly also being used in industrial applications, for example in outdoor advertising. In outdoor advertising applications, the ink must satisfy particular requirements with regard to light-fastness and water resistance. The coloring components must moreover be very finely divided, so that they do not clog the printing nozzles. Both dyes and, more recently, pigments have been used as the colorants. The latter have the advantage over dyes of having very high light-fastness and being water resistant. Pigments have a disadvantage in comparison with dyes which is that they form stable dispersions with extended storage stability only if they are treated with surface-active substances (surfactants). Pigment particles assume the form of aggregates instead of primary particles. Pigment aggregates are larger than soluble dyes. If the pigment aggregates are insufficiently finely dispersed, they clog the print head nozzles. Large aggregates moreover modify the light absorption characteristics of the pigment black, resulting in greyer prints and a loss of covering power.

The first patents to address the use of pigment blacks in inkjet inks are U.S. Pat. No. 5,085,698 and U.S. Pat. No. 5,320,668. These documents describe the use of water-soluble acrylates for pigment stabilization.

It is known to produce aqueous carbon black dispersions with carbon blacks having an average primary particle size of no greater than 30 nm and a DBP value of at least 75 ml/100 g (U.S. Pat. No. 5,538,548).

It is furthermore known to produce aqueous carbon black dispersions using water-soluble organic solvents and water-soluble acrylic resins (U.S. Pat. No. 5,609,671).

Known aqueous carbon black dispersions exhibit the disadvantage that at least one wetting agent is required to produce or stabilize the dispersion.

SUMMARY OF THE INVENTION

The object accordingly arises of producing carbon black dispersions which do not exhibit this disadvantage.

The present invention provides aqueous carbon black dispersions, characterized in that the carbon black dispersion contains no wetting agent and contains at least one ozone-oxidized carbon black.

Starting carbon blacks which may be used for ozone oxidation are furnace blacks, gas blacks, lamp blacks, acetylene blacks, carbon blacks containing Si (known from WO 98/45361 or DE 19613796), inversion blacks (known from DE 19521565) and carbon blacks containing metal (known from WO 98/42778). Gas blacks may preferably be used as the starting carbon black for ozone oxidation, particularly preferably finely divided gas blacks such as, for example, FW 285, FW 1 or FW 18 from Degussa-Hüils AG. Ozone oxidation of the starting carbon black may proceed using the known process from DE 198 240 47.

The ozone-oxidized carbon black may have a content of volatile constituents (DIN 53552) of greater than 25%, preferably of greater than 30%. The aqueous carbon black dispersion may contain conventional additives required for the production of a ready-to-use ink, such as for example glycol, polyvinylpyrrolidone, isopropanol, 1,2-propanediol or pH regulators. The carbon black content in the finished dispersion may be at most 30%, preferably at most 15%, particularly preferably 5–15%.

The pH value of the finished dispersion may be pH 4–12, preferably pH 6–11, particularly preferably pH 8–10.

The ozone-oxidized carbon black has a large number of surface groups. Consequently, no wetting agent is required to stabilize the aqueous carbon black dispersion. The carbon black dispersion according to the invention has the advantage of a low viscosity and an elevated surface tension. The higher surface tension means that smaller droplets may be produced in the inkjet process, resulting in higher optical densities on the paper. Soiling of the print head may additionally be reduced.

The present invention also provides a process for the production of the aqueous carbon black dispersion, which process is characterized in that ozone-oxidized carbon black is dispersed in water, optionally with the addition of additives, and dispersion is optionally performed using bead mills, ultrasound apparatus, or a rotor-stator-mill (e.g., an ULTRA-TURRAXO® mill).

The aqueous carbon black dispersions according to the invention may be used for the production of inks, lacquers and printing inks, in particular inkjet inks, printing inks and water-based lacquer systems.

DETAILED DESCRIPTION OF THE INVENTION

EXAMPLES

The carbon black dispersions according to the invention are produced as follows:

1. Preparation of the Solution

50% of the quantity of additives for regulating the pH value are added to the entire quantity of distilled water and homogenized manually or with a stirrer.

2. Incorporation of the Carbon Black

The ozone-oxidized carbon black is incorporated into the prepared solution of paragraph 1, manually or with a stirrer.

3. Dispersion

The dispersion prepared in paragraph 2 is dispersed with an ultrasound apparatus.

4. Subsequent Preparation of the Dispersion 24 h after dispersion has been performed, the remainder of the additives for regulating the pH value and the entire quantity of 1,2-propanediol are stirred in. Coarse particles may be separated from the resultant dispersion by centrifugation or filtration.

Table 1 shows the analytical data for the ozone-oxidized carbon black, which is produced according to DE 19824047, Example 1.

The composition of the aqueous carbon black dispersions and the properties thereof are shown in Table 2.

TABLE 1

| Gas black FW 18, ozone-oxidized | | |
|---|---|---|
| Volatile constituents DIN 53552 | % | 31.5 |

TABLE 2

| Constituents | Unit | Comparative Example | Inventive Example |
|---|---|---|---|
| Coloring black FW 18 | % | 15 | — |
| Coloring black FW 18, Ozone-oxidized | % | — | 10 |
| Wetting agent: | | | |
| [LUTENSOL] LUTENSOL ® AO30 | % | 6 | — |
| [HYPERMER] HYPERMER ® CG6 | % | 2 | — |
| 1,2-Propanediol | % | — | 6.7 |
| Distilled water | % | 76.8 | 80.8 |
| PH regulator: Dimethylethanolamine | % | 0.2 | 2.5 |
| Properties | | | |
| Average particle diameter | Nm | 90 | 85 |
| PH value | | 8.0 | 9.0 |
| Viscosity, RT | MPas | 10 | 2.6 |
| Surface tension | MN/m | 43 | 67 |
| Optical density (copy paper) | | 1.03 | 1.35 |

Average particle size is determined by photon correlation spectroscopy.

Optical density is determined with a Macbeth RD 918 densitometer on test prints produced on a Hewlett Packard 660 C printer.

The pH value is determined directly in the carbon black dispersion using a conventional commercial measuring electrode.

The aqueous carbon black dispersion according to the invention exhibits a lower viscosity, higher surface tension and greater optical density than the Comparative Example.

The components used in the production of the carbon black dispersions are characterized as follows:

Coloring black FW 18 is a gas black with an average primary particle size of 15 nm.

LUTENSOL® AO 30 is a nonionic wetting agent comprised of oxo-alcohol ethoxylates (manufacturer: BASF).

HYPERMER® CG 6 is a nonionic wetting agent consisting of crosslinked polyoxyethylene-acrylic acid (manufacturer: ICI).

What is claimed is:

1. An aqueous carbon black dispersion suitable for use in printing inks, comprising ozone-oxidized carbon black, wherein the dispersion contains no wetting agent, and wherein said ozone-oxidized carbon black is obtained by treating carbon black with ozone in a gaseous medium.

2. The aqueous carbon black dispersion according to claim 1, wherein the ozone-oxidized carbon black is ozone-oxidized gas black.

3. The aqueous carbon black dispersion according to claim 1, wherein the ozone-oxidized carbon black has a volatile constituent content of greater than 25%.

4. The aqueous carbon black dispersion according to claim 1, wherein the carbon black content in the dispersion is at most 30%.

5. The aqueous carbon black dispersion according to claim 1, wherein the pH is between 4 and 12.

6. A process for the production of an aqueous carbon black dispersion suitable for use in printing inks, comprising:

a) adding ozone-oxidized carbon black to water; and
   b) dispersing said ozone-oxidized carbon black in water, optionally with addition of additives, and optionally using bead mills, ultrasound apparatus, or a rotor-stator-mill.

7. The process for the production of an aqueous carbon black dispersion according to claim 6, wherein, after the dispersing has been carried out, the carbon black dispersion is centrifuged or filtered.

8. A method for preparing inkjet inks, printing inks or water-based lacquer systems comprising admixing the carbon black dispersion according to claim 1 with other components of said inkjet inks, printing inks or water-based lacquer systems.

9. Inkjet inks, printing inks or water-based lacquer systems comprising the carbon black dispersion according to claim 1.

* * * * *